United States Patent [19]

Misencik

[11] 4,442,470
[45] Apr. 10, 1984

[54] GROUND FAULT RECEPTACLE WITH ARRANGEMENT FOR PROTECTING INTERNAL ELECTRONICS

[75] Inventor: John J. Misencik, Shelton, Conn.

[73] Assignee: Westinghouse Electric Corp., Pittsburgh, Pa.

[21] Appl. No.: 416,786

[22] Filed: Sep. 10, 1982

[51] Int. Cl.³ .............................................. H02H 3/33
[52] U.S. Cl. ..................................... 361/46; 361/115; 335/18; 335/192
[58] Field of Search ..................... 361/46, 45, 44, 115; 335/18, 170, 171, 192, 202, 19, 60, 64; 200/159 R, 159 A

[56] References Cited

U.S. PATENT DOCUMENTS

| | | | |
|---|---|---|---|
| 3,813,579 | 5/1974 | Doyle et al. | 361/46 |
| 3,931,601 | 1/1976 | Anderson | 361/46 X |
| 4,010,431 | 3/1977 | Virani et al. | 361/45 X |
| 4,010,432 | 3/1977 | Klein et al. | 361/45 X |
| 4,051,544 | 9/1977 | Vibert | 361/45 |
| 4,084,203 | 4/1978 | Dietz et al. | 361/45 |

Primary Examiner—Patrick R. Salce
Attorney, Agent, or Firm—G. H. Telfer

[57] ABSTRACT

A third pair of contacts, in addition to main power contacts, is provided that includes a conductive path through the latch member holding the power contacts in closed position and the latch member, being responsive to movement of the solenoid plunger operated from the trip coil, is the first of the three pairs of contacts to open upon a trip of the unit and is the first to be closed upon a resetting by manual force on the reset button.

5 Claims, 2 Drawing Figures

GROUND FAULT RECEPTACLE WITH ARRANGEMENT FOR PROTECTING INTERNAL ELECTRONICS

BACKGROUND AND SUMMARY OF THE INVENTION

This invention relates to ground fault interrupters and particularly ground fault receptacles.

For background and general description, reference is made to Virani et al. U.S. Pat. No. 4,010,431, Mar. 1, 1977, which describes a ground fault receptacle with a switch arrangement on which the present invention improves. A receptacle as described in the patent has in addition to the contacts for opening the hot line and neutral conductors, L and N, respectively, upon the occurrence of a ground fault, a third pair of contacts connected in a circuit branch between the conductors L and N for supplying operating power to the internal electronics of the device. Such a third pair of contacts is very desirable when arranged, as in the patent, to be sequentially operated with the main power contacts so that the third pair of contacts always opens first upon a trip and closes first upon resetting. The sequence of the contacts insures a ground fault will not go undetected upon closing of the power contacts and also insures protection of the internal electronics upon a trip. It is desirable to provide this feature in order to protect against possible damage as may result if the hot line and neutral conductors of the associated electrical distribution system are reversed in their connection to the unit. A primary purpose is to insure complete removal of power from the semiconductor switch of the trip electronics upon an opening so that total line current does not pass therethrough and so it is maintained in the totally off condition regardless of the internal circuitry being of the type in which a capacitance may retain a charge and result in a continual current. By the prior patent the movable armature carrying the movable contacts of the two pairs of main power contacts causes the opening of the contacts to the sensing circuit upon a trip.

The present invention uses the concept of the apparatus of the above patent by having an additional pair of contacts, in addition to the main power contacts, that is the first pair of contacts to open upon a trip of the unit and is the first pair of contacts to close upon a reclosing of the unit in order to insure effective operation as well as to provide protection of the internal electronics. The present invention provides an improvement by having the third pair of contacts arranged in a more simple form than previously so that it is both more economical and more compact than formerly. In addition, the arrangement of the present invention provides more reliable operation of the third pair of contacts as there is insurance against any operation of the power contacts unless the third pair of contacts is closed and the third pair of contacts are more assuredly required to be opened upon a trip before the power contacts.

These multiple objectives and advantages of the present invention are achieved in an arrangement in which the means to supply operating power to the electronic circuit of the unit comprises conductive connections from the line conductors including the latch member which holds the movable member with the power contacts in engagement when it is in its closed position and which releases the power contacts from engagement when it is in its open position. Also, in the specific embodiment to be described hereinafter, the circuit to the electronics includes as a conductive element a spring which provides the closing force on the contact armature plate upon reclosing after a trip. Thus, it is seen that the present invention is one in which the mechanical elements for releasing and moving the power contacts are utilized directly as conductive elements in the circuit for powering the electronics which is both a convenience in terms of simplicity, cost and space saving as well as an enhancement of the reliability of performance of the unit.

While the present invention will be described primarily with reference to a ground fault receptacle, it is not necessarily so limited and it will be seen that its application can be made to ground fault circuit breakers as well.

DESCRIPTION OF PREFERRED EMBODIMENTS

Figure 1:
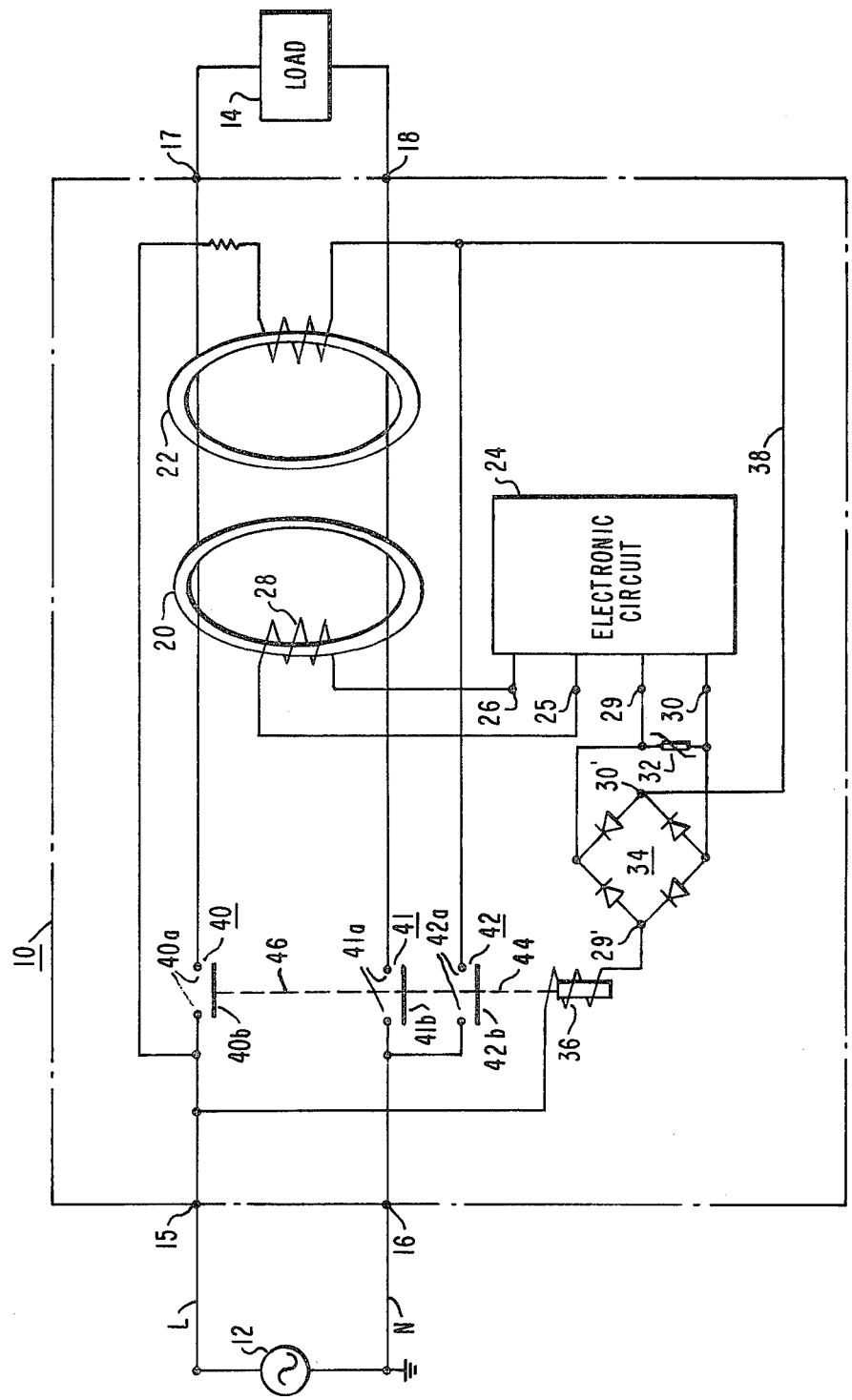
Figure 2:
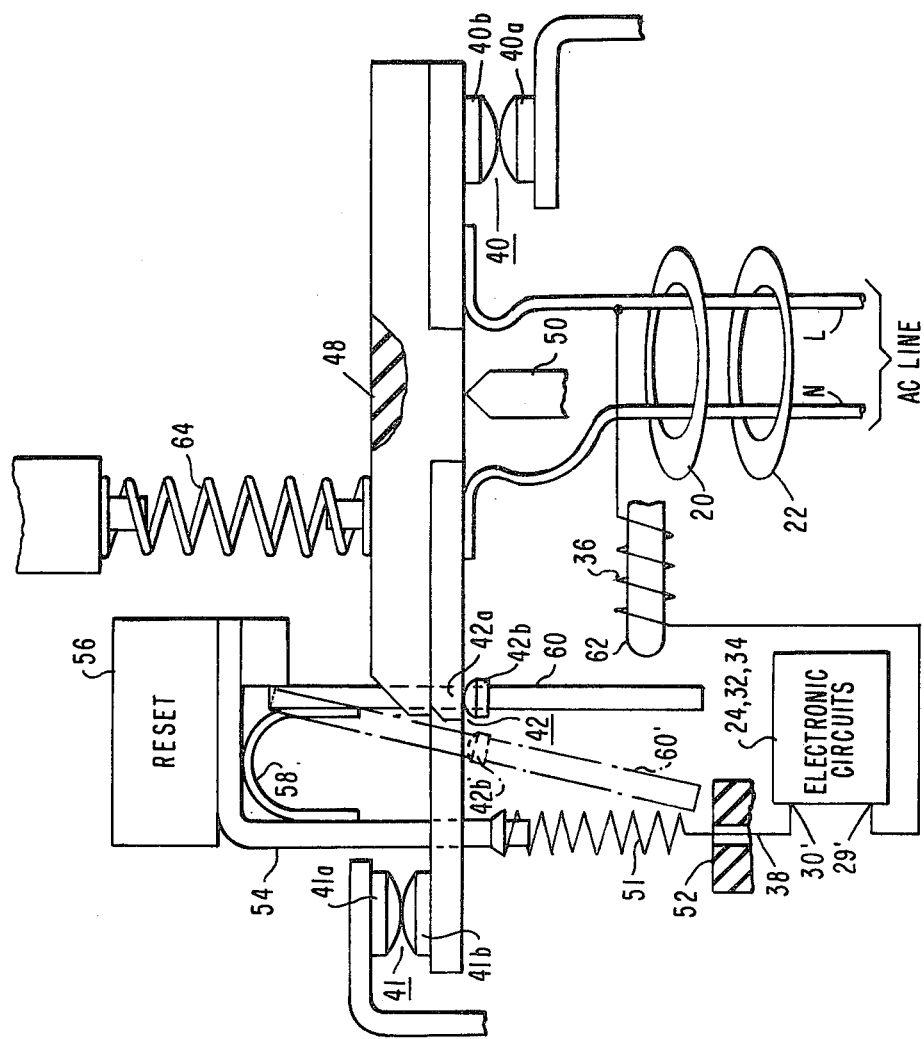

FIG. 1 is a generalized circuit schematic of an embodiment of the present invention; and FIG. 2 is a partial view of a ground fault receptacle in accordance with an embodiment of the present invention.

DESCRIPTION OF THE PREFERRED EMBODIMENT

Referring to FIG. 1, a ground fault circuit interrupter 10 in accordance with the present invention is schematically illustrated connected between an AC supply 12 and a load 14. The system depicted assumes a usual single phase, two wire system in which the distribution conductors are identified as a hot line L and a neutral conductor N, the latter being connected to the ground side of the supply 12. Conductors L and N extend to the load 14 through the interrupter unit 10 by connections at input terminals 15 and 16 and output terminals 17 and 18. For use in a ground fault receptacle, as is contemplated, the load 14 is associated with the unit 10 through a male plug and female socket connection in the normal manner at terminals 17 and 18.

The unit 10 has a sensor transformer 20 through which conductors L and N extend as primary windings. Conductors L and N also extend as primary windings through an additional grounded neutral transformer 22 which may, for example, be substantially in accordance with Coley et al. U.S. Pat. No. 3,959,693, May 25, 1976.

The unit further includes an amplifier and trip circuit 24 that is sometimes referred to herein as simply the electronic circuit. Suitable circuitry for the electronic circuit 24 is generally known; as one example, the circuit of Engel et al. U.S. Pat. No. 3,852,642, Dec. 3, 1974 may be adapted for the present purpose. The circuit 24 has inputs 25 and 26 from a sensing winding 28 of the sensing transformer 20 and also has connections at two additional terminals 29 and 30 at which the circuit both receives its operating power and provides a trip signal to the rest of the unit. As shown, circuit terminals 29 and 30 are connected with a transient voltage suppressor element 32 such as a metal oxide varistor thereacross and also a full wave rectifier 34. One side of the full wave rectifier 34 is connected through a solenoid trip coil 36 to conductor L. The other side of the rectifier is connected by means to be further described through a circuit branch 38 to conductor N.

Each of the conductors L and N have switches 40 and 41 connected respectively in series with them which comprise in each case a stationary contact 40a and 41a and a movable contact 40b and 41b. Circuit branch 38 connects to conductor N through a third switch 42 having a fixed contact 42a on N and a movable contact 42b on a flexible element operated, on opening, by the plunger of the solenoid associated with coil 36. Dashed line 44 represents the mechanical linkage between the plunger of coil 36 and movable contact 42b. It is also the case that the movable contact 42b of the third switch is a latch member, to be further described in connection with FIG. 2, that latches in the closed position the switches 40 and 41 as well as 42. Upon release of 42b from 42a, contacts 40b and 41b are released and move from their corresponding fixed contacts. The movable contacts 40b and 41b of the power switches and the latch 42b by which the electronic circuit 24 is connected to conductor N are mechanically interrelated so that the opening of the latch by the movement of the solenoid plunger necessarily opens the power contacts. The dashed line 46 in FIG. 1 generally illustrates the mechanical relation between the movable contacts which will be further described with reference to FIG. 2.

The apparatus 10 may also include, as is conventional, a test circuit branch (not shown) extending from conductor L on the load side of the sense transformer 20 to the supply side of conductor N. The test circuit branch would normally include a current limiting resistor and a manually operable test switch in accordance with prior practice.

Referring to FIG. 2, part of the unit 10 of FIG. 1 is shown which provides a specific embodiment of the improvement in accordance with this invention. In accordance with this embodiment, the movable power contacts 40b and 41b are carried on an armature plate 48 substantially in accordance with that of above referred to U.S. Pat. No. 4,010,431. As in the patent, the armature plate 48 has an off-center fulcrum, here shown at 50, about which it pivots and is shown in FIG. 2 in the closed position. The electronic circuitry including elements 24, 32 and 34 of FIG. 1 is shown with terminals 29' and 30' connected as shown, with terminal 29' connected back to line conductor L through solenoid coil 36. The path from terminal 30' to conductor N extends through conductor 38 to a coiled spring 51 which bears against a fixed element 52 of the housing and from the spring through a conductive part 54 on which the reset button 56 of the unit is supported. The first conductive part 54 is fixed in relation to the reset button 56 but has a spring member 58 associated with it against which a latch member 60 works. The latch member 60 has a configuration such that in its closed position the armature plate 48 is held in fixed relation to the reset button 56 by the latch member and direct contact is made between the latch member 60 at 42b and the conductive element 42a that is in series with conductor N. In the closed position, as shown, the spring 51 holds the reset button 56 in an outer position limited by the permissible outward travel of the latch 60 against the armature plate 48 which is in turn held from moving further in the vertically upward direction as shown by the fixed contact 41a.

Upon a ground fault or other trip of the unit, including a grounded neutral trip, the circuitry operates to energize the trip coil 36 and thereby result in the firing of the solid state switch element in the electronics, the conduction of high current through the trip coil and the movement of solenoid plunger 62. Solenoid plunger 62 is physically related to the latch member 60 so that upon its movement to the left, it hits against the latch member, releasing it from its closed position under the armature plate 48 so that the armature plate under the influence of a second spring 64 tilts downwardly on the left side of the drawing about the pivot 50 and results in opening of both the power switches 40 and 41. It is significant in this operation that the first point of circuit opening is that of the releasing of the latch member 60 at 42b from the armature plate conductor at 42a it and that necessarily this opening must occur before the power contacts 40b and 41b are free to move. The latch member is shown in dashed lines 60' as deflected by the plunger 62.

On reclosing of the unit by pushing in the reset button 56, the latch member 60 slides along the edge of the armature plate until its latch is under the held edge thereof and makes contact again at 42a and 42b. Only then when the reset button is manually released does the closing force of spring 51 result in the closing of the power contacts. Necessarily the opening force provided by the uppermost spring 64 is greater than the closing force provided by the spring 51 which is in the series circuit supplying the electronics.

In contrast to the embodiment of the aforementioned patent, the present invention does not require the structural arrangement for the third switch contacts as elements separate from the armature plate 48 and latch 60.

In the course of this description, reference has been made to the portion of the circuit which includes the latch member as a conductive element as being that associated with conductor N of the distribution system. This however is a matter of non-criticality because ground fault receptacles must, in accordance with Underwriters' Laboratories specifications, provide reliable operation even in the event the conductors L and N are reverse wired on the unit. The present invention accomplishes these purposes because of the assurance that the circuit branch powering the electronics is opened first and closed first on any opening or reopening, respectively. In accordance with the present invention, as long as that function is achieved, it remains much less important the sequence of opening the main power switches 40 and 41. It is preferred and the present embodiment can provide a sequence in which the nominal neutral contacts 41a and 41b are opened prior to the nominal hot contacts 40a and 40b and would be closed first, but this is not as essential as the making and breaking of contact by the latch member.

I claim:
1. A ground fault receptacle comprising:
   first and second pairs of cooperable contacts, each of said pairs of contacts being operable between an open position and a closed position with one of said contacts of each of said pairs of contacts being stationary and the other of said contacts of each of said pairs of contacts being movable, said first pair of contacts being connectable in series with a hot line conductor (L) of the electrical distribution system and said second pair of contacts being connectable in series with a neutral conductor (N) of the electrical distribution system;
   ground fault sensing and interrupting means associated with conductors L and N for causing opening of said first and second pairs of contacts upon a ground fault, said ground fault sensing means comprising an electronic circuit responsive to a sensed ground fault to energize a solenoid trip coil whose plunger causes release of a latch member holding said pairs of contacts in the closed position and resulting in movement of said movable contacts of said pairs of contacts to the open position;

means for suppling operating power to said electronic circuit comprising conductive connections from said conductors L and N wherein said conductive connection from one of said conductors N comprises said latch member which has a closed position in contact with said one conductor and an open position spaced therefrom, and said latch member moves from said closed position to said open position upon a trip prior to the opening of either of said first and second pairs of contacts.

2. A ground fault interrupter in accordance with claim 1 wherein:

said latch member makes contact with said one conductor upon closing prior to the closing of either of said first and second pairs of contacts.

3. A ground fault interrupter in accordance with claim 1 wherein:

said movable contacts of said first and second pairs of contacts are disposed on a pivotably mounted armature plate and said latch member engages said armature plate on one side of the pivotal mounting thereof adjacent said one conductor.

4. A ground fault interrupter in accordance with claim 3 wherein:

said conductive connection comprises a conductive closing spring and a conductive reset button support member and said latch member is in spring mounted relation with said conductive reset button support member.

5. A ground fault interrupter in accordance with claim 1 further comprising:

receptacle socket means for energization by an electrical distribution system of at least first and second wires L and N and for receiving a plug connected with an electrical load.

* * * * *